Dec. 21, 1954
W. W. McCAIN ET AL
2,697,236
MACHINE FOR GLUING BOOK BACKS
Filed Jan. 31, 1950
11 Sheets-Sheet 2
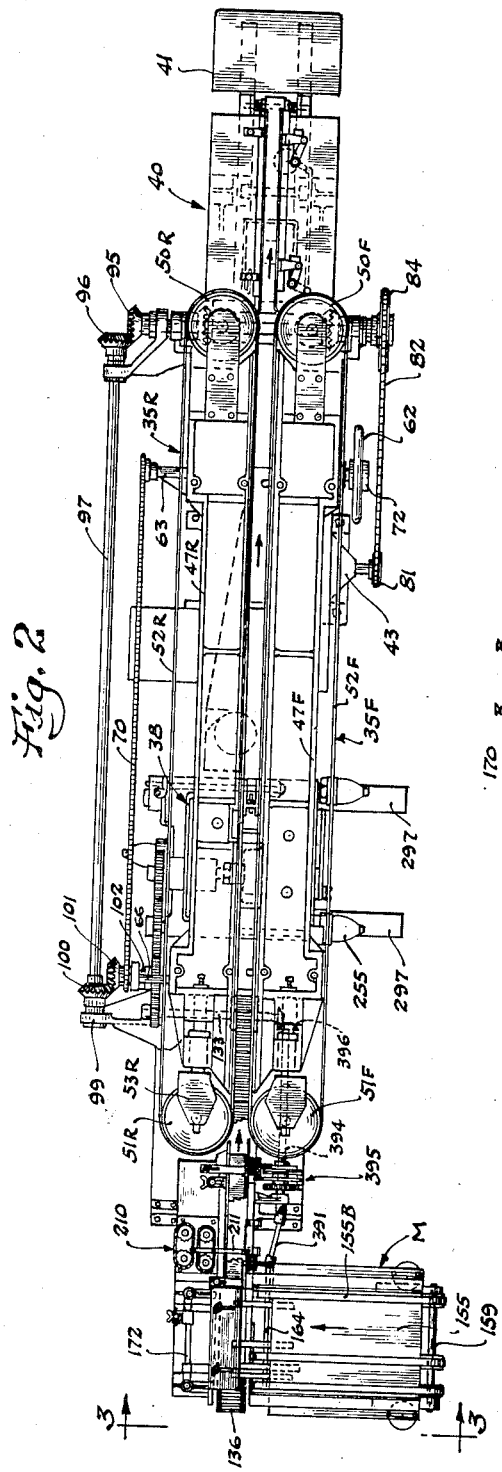
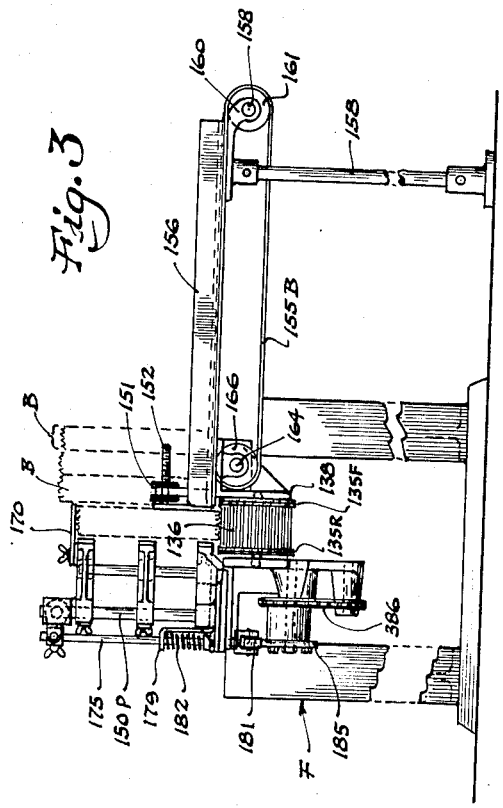
Inventors
William W. McCain
Chester E. Hillman
By Wallace and Cannon
Attorneys Dec. 21, 1954
W. W. McCAIN ET AL
2,697,236
MACHINE FOR GLUING BOOK BACKS
Filed Jan. 31, 1950
11 Sheets-Sheet 3
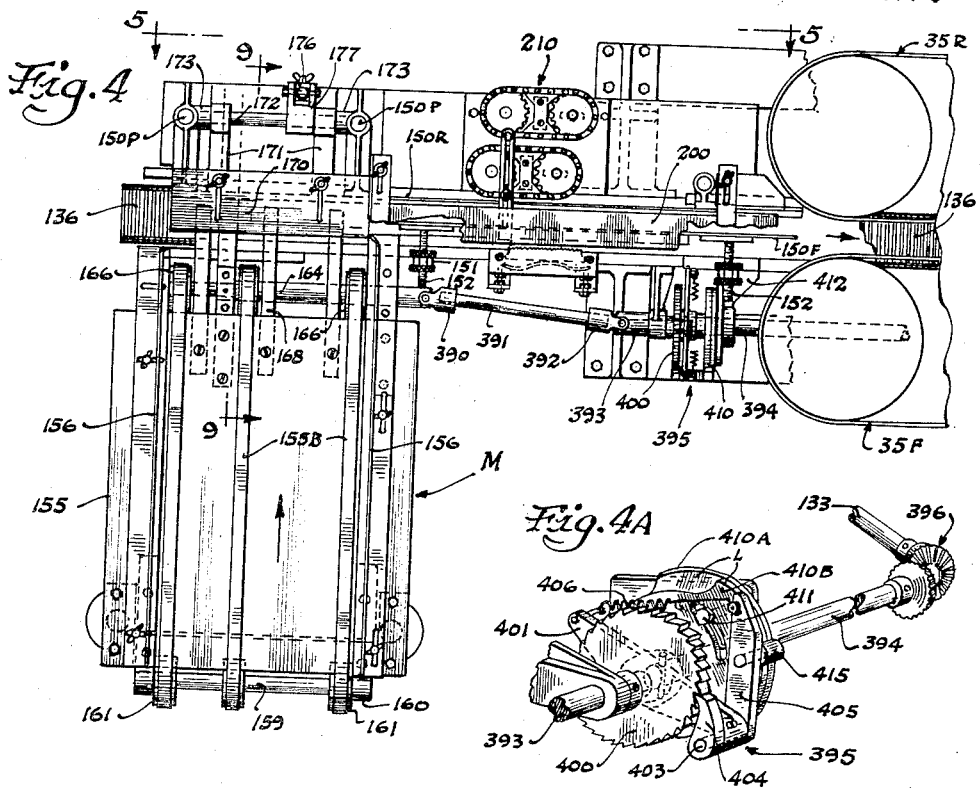
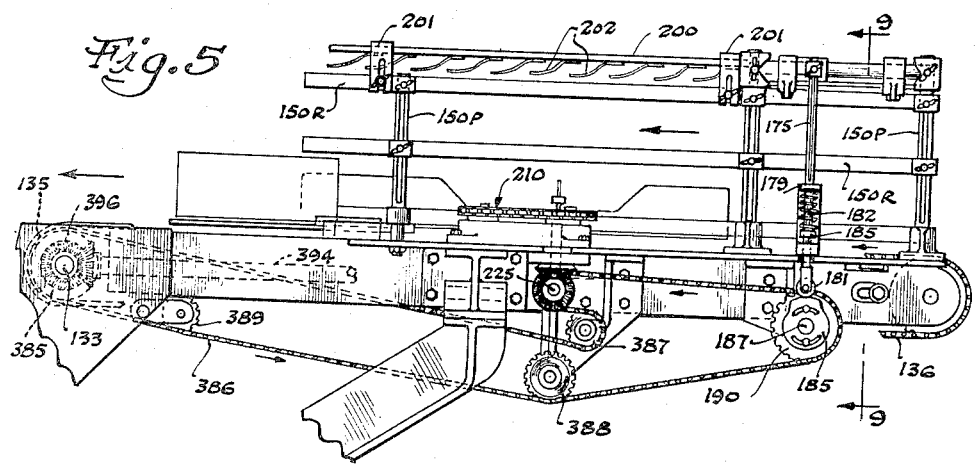
Inventors
William W. McCain
Chester E. Hillman
By Wallace and Cannon
Attorneys Dec. 21, 1954
W. W. McCAIN ET AL
2,697,236
MACHINE FOR GLUING BOOK BACKS
Filed Jan. 31, 1950
11 Sheets-Sheet 4
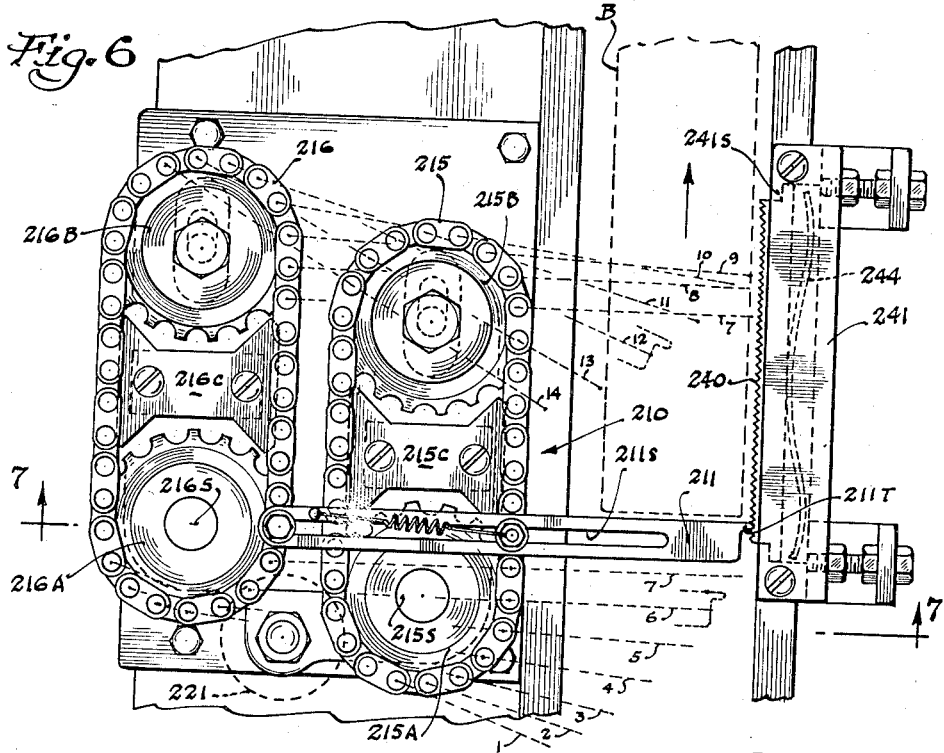
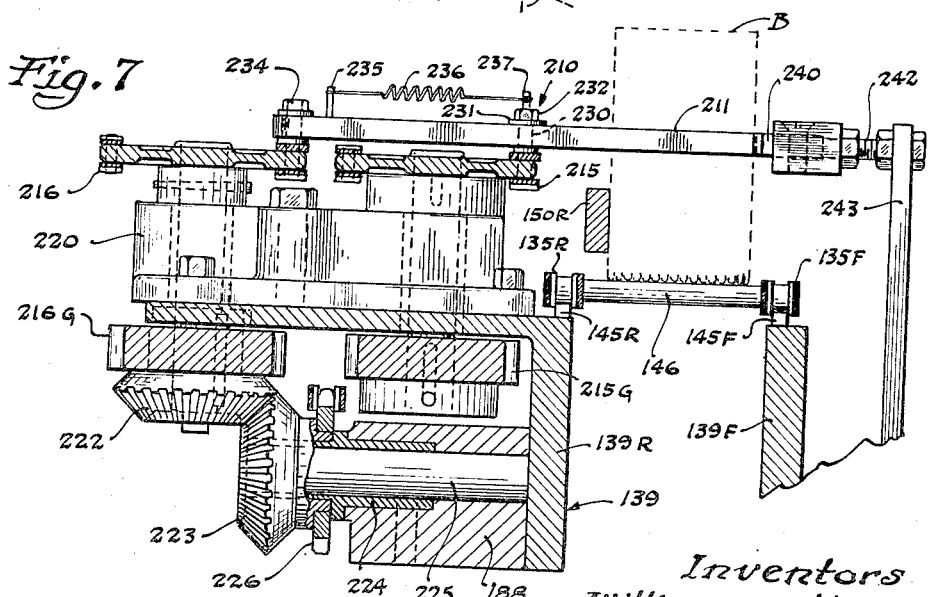
Inventors
William W. McCain
Chester E. Hillman
By Wallace and Cannon
Attorneys Dec. 21, 1954　　　W. W. McCAIN ET AL　　　2,697,236
MACHINE FOR GLUING BOOK BACKS
Filed Jan. 31, 1950　　　　　　　　　　　　　　11 Sheets-Sheet 5
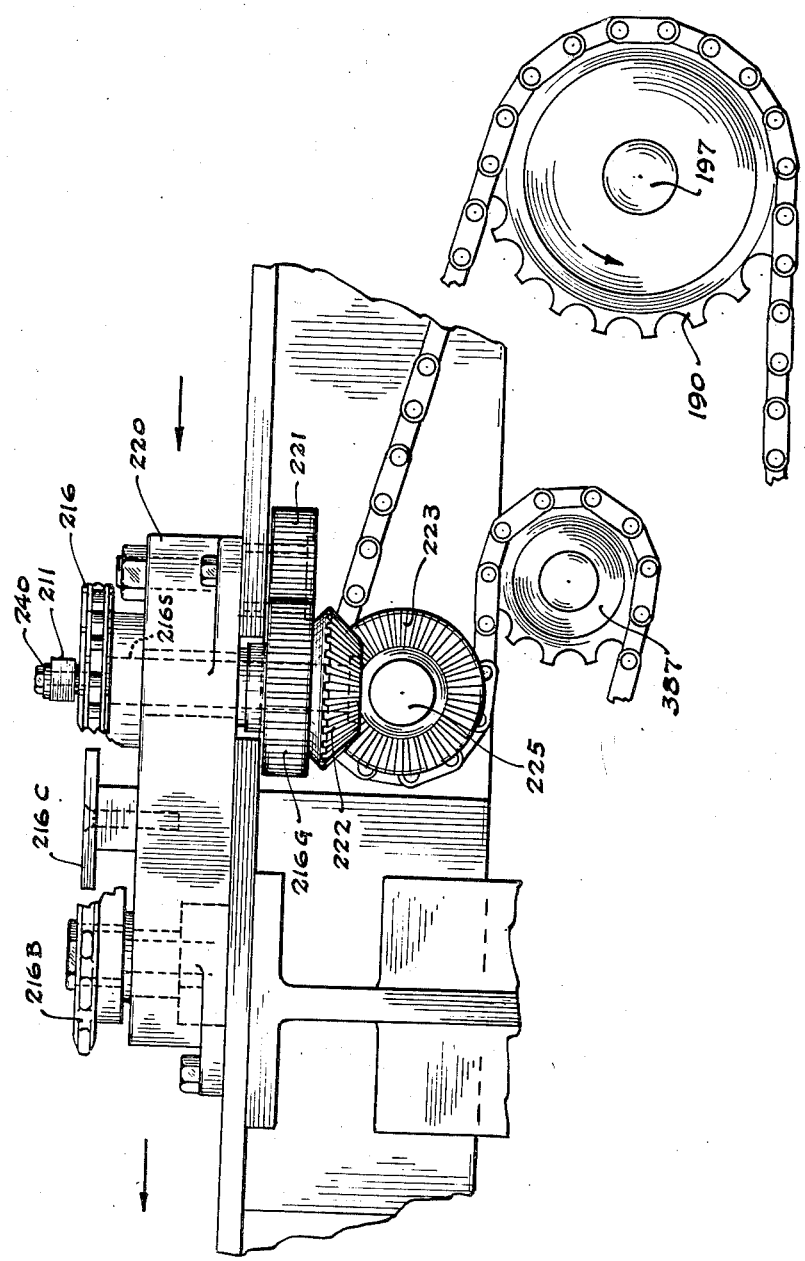
Inventors
William W. McCain
Chester E. Hillman
By Wallace and Cannon
Attorneys Dec. 21, 1954
W. W. McCAIN ET AL
2,697,236
MACHINE FOR GLUING BOOK BACKS
Filed Jan. 31, 1950
11 Sheets-Sheet 6
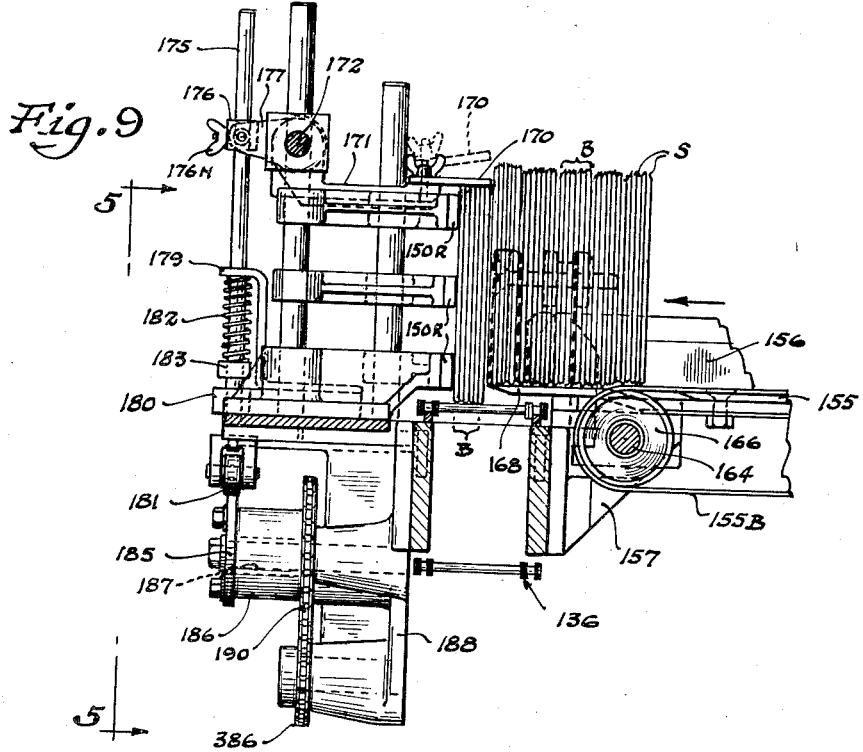
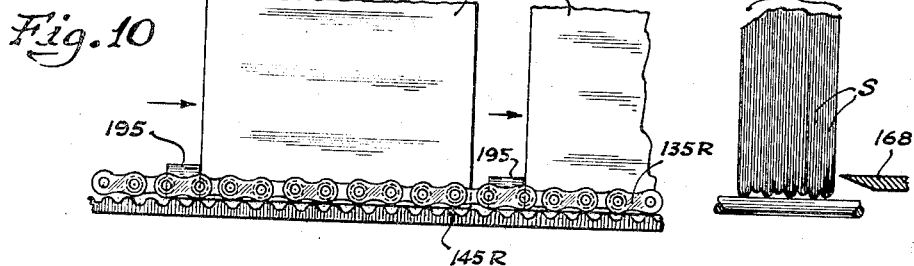
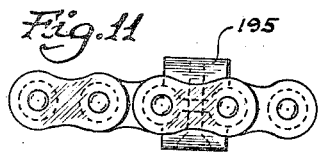
Inventors
William W. McCain
Chester E. Hillman
By Wallace and Cannon
Attorneys Dec. 21, 1954
W. W. McCAIN ET AL
2,697,236
MACHINE FOR GLUING BOOK BACKS
Filed Jan. 31, 1950
11 Sheets-Sheet 7
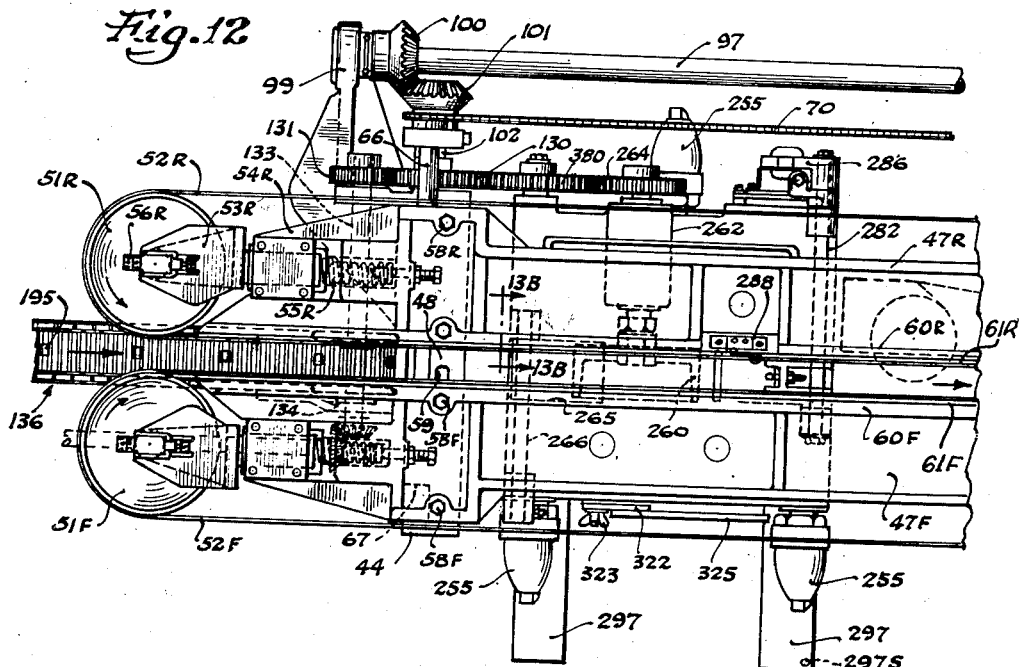
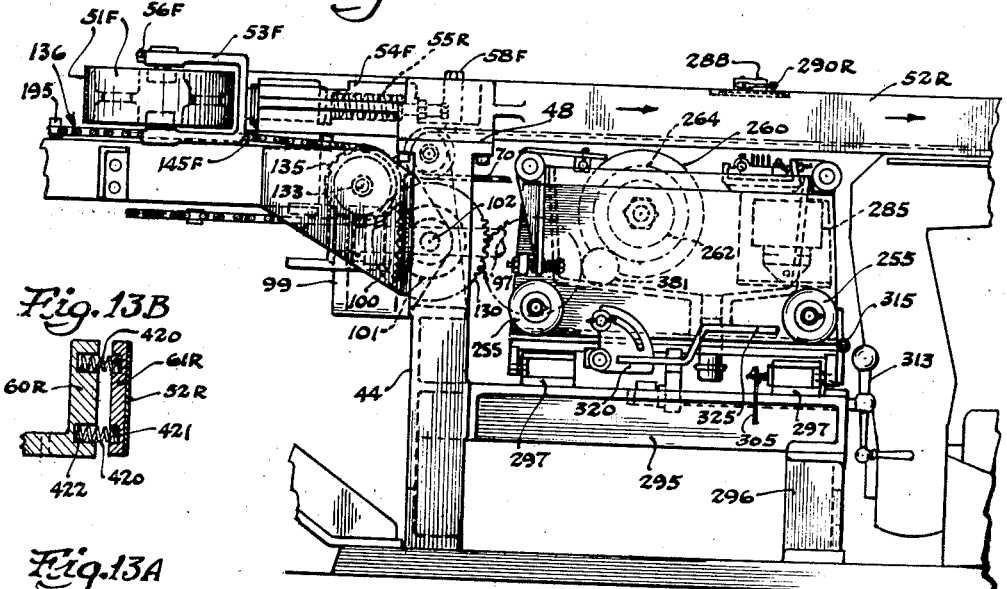
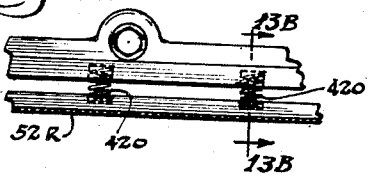
Inventors
William W. McCain
Chester E. Hillman
By Wallace and Cannon
Attorneys

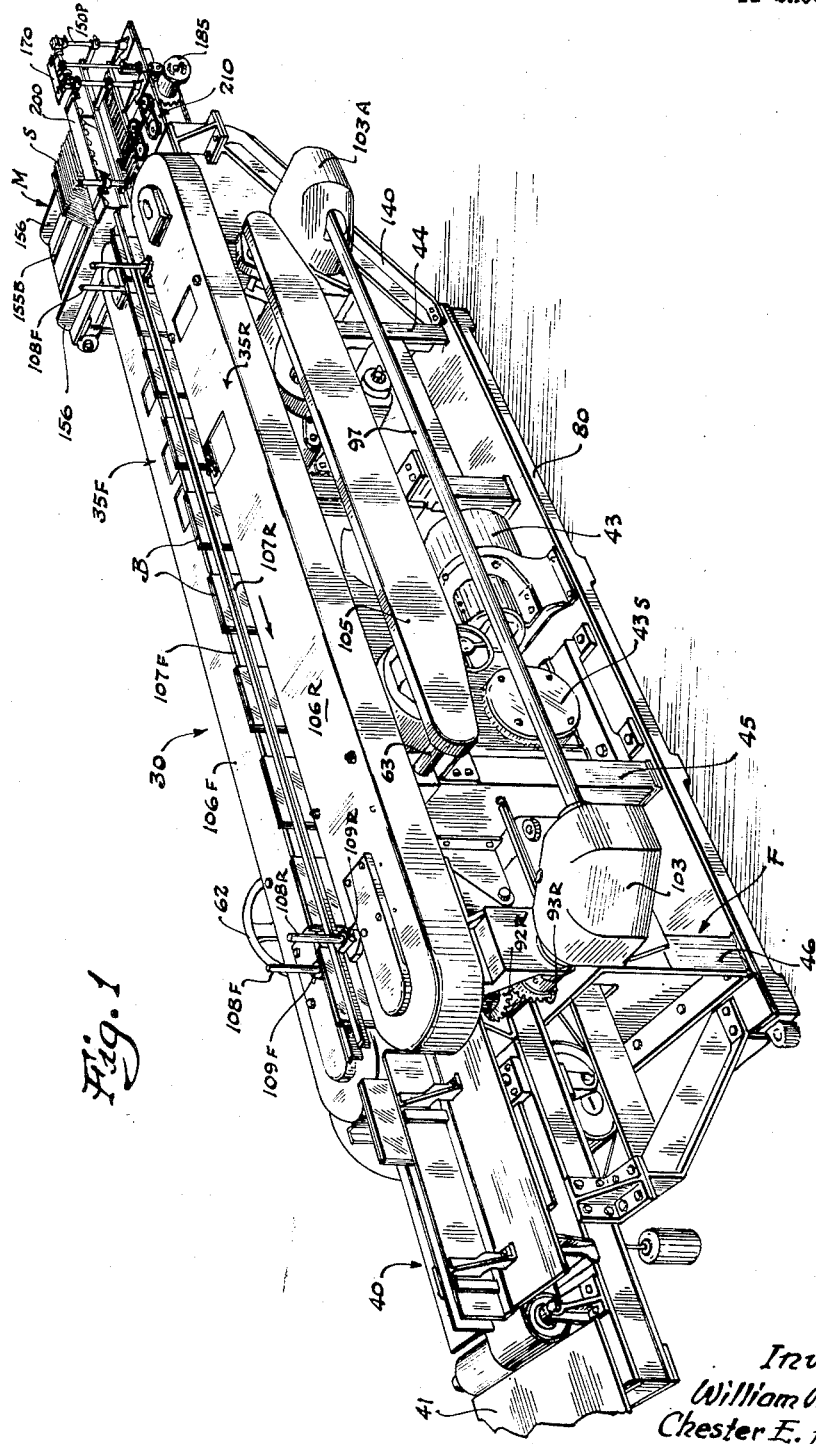

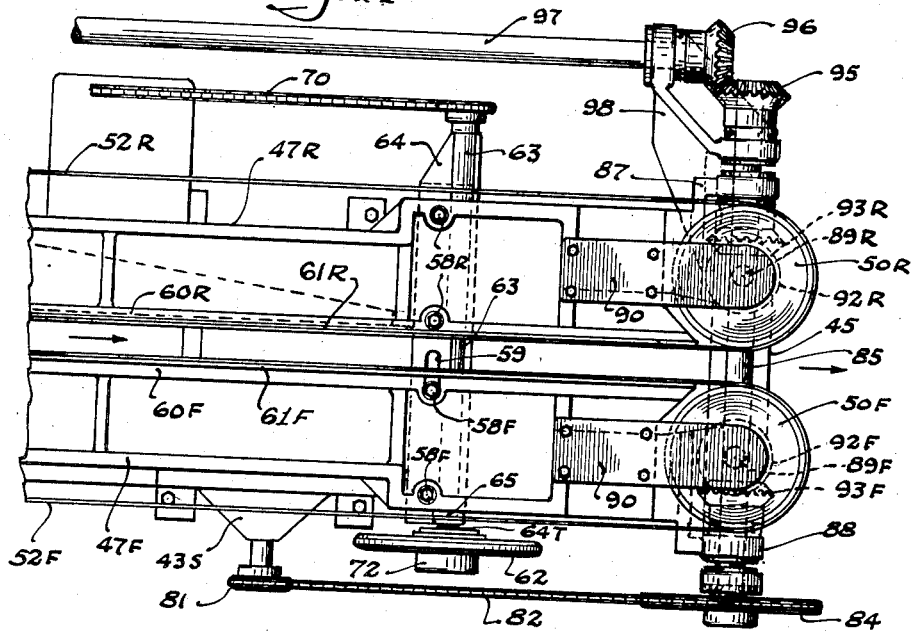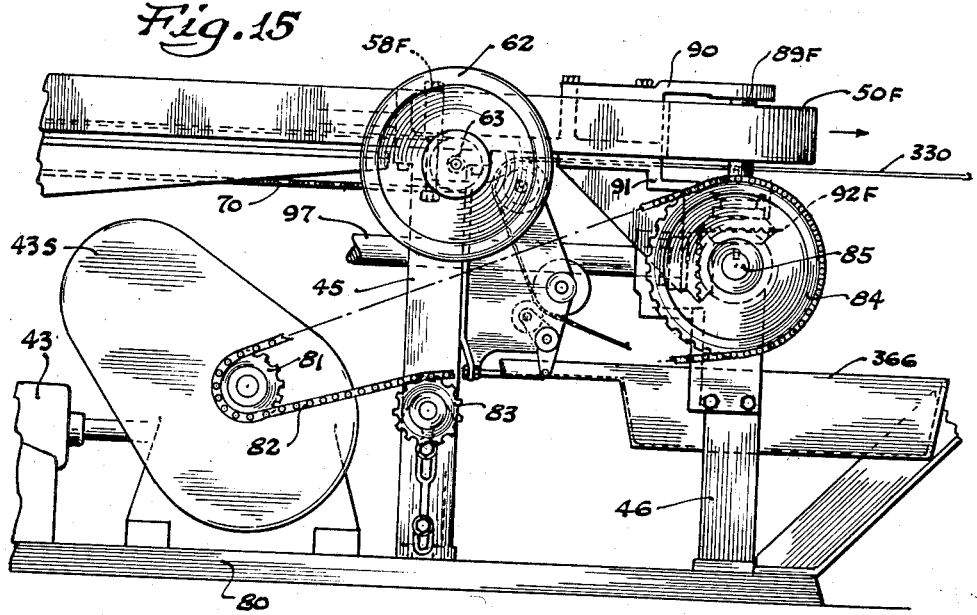

Dec. 21, 1954 W. W. McCAIN ET AL 2,697,236
MACHINE FOR GLUING BOOK BACKS
Filed Jan. 31, 1950 11 Sheets-Sheet 9
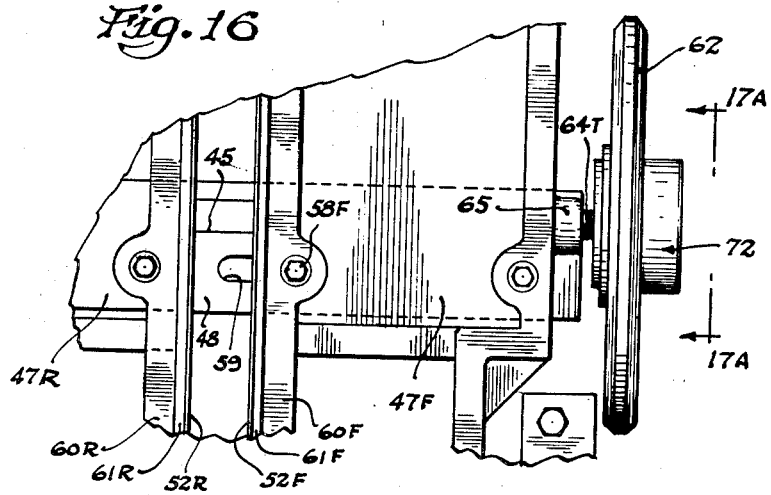
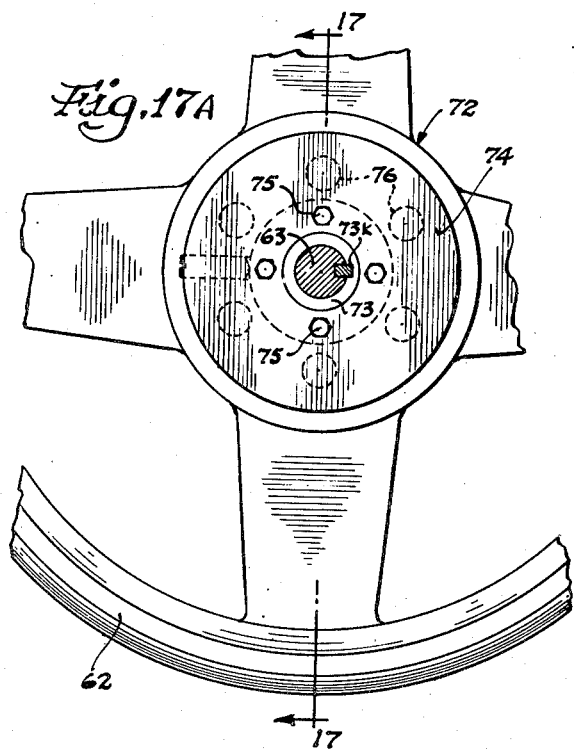
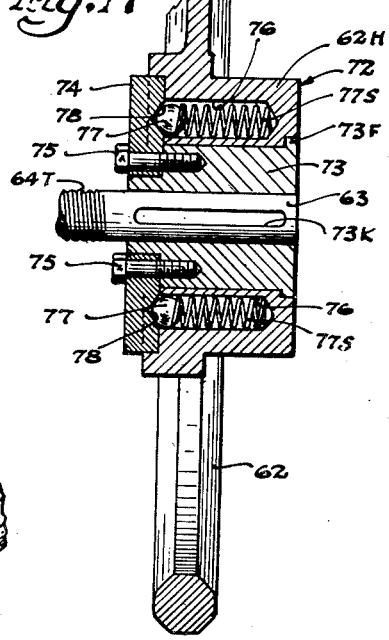
Inventors
William W. McCain
Chester E. Hillman
By Wallace and Cannon
Attorneys

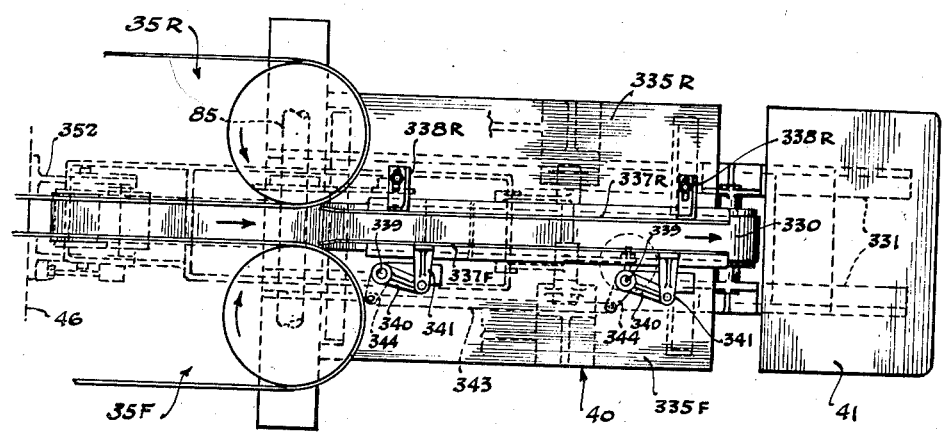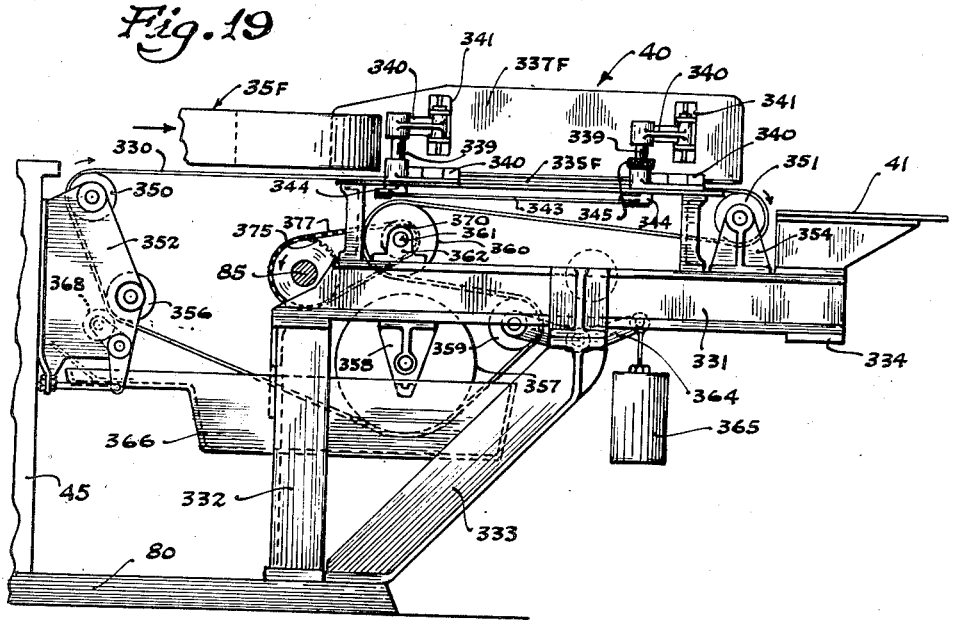

Dec. 21, 1954

W. W. McCAIN ET AL 2,697,236

MACHINE FOR GLUING BOOK BACKS

Filed Jan. 31, 1950

Inventors
William W. McCain
Chester E. Hillman
By Wallace and Cann
Attorneys

United States Patent Office 2,697,236
Patented Dec. 21, 1954

2,697,236
MACHINE FOR GLUING BOOK BACKS

William W. McCain, Oak Park, and Chester E. Hillman, Park Ridge, Ill.; said Hillman assignor to said McCain Application January 31, 1950, Serial No. 141,484

7 Claims. (Cl. 11—1)

This invention relates to the production of case bound books and particularly to machines for gluing the book backs, as such backs are defined by the folded edges of the several signatures that make up the book.

In the production of case bound books, the printed sheets are folded together and sewed to afford a plurality of sections, or signatures, and these signatures are then placed together in the proper order and the folded and sewed back edges of the signatures are glued together. In the event that the signatures are to be trimmed, this may be done either before or after the gluing operation is performed.

The glue that is applied to the book back is brushed after it has been applied to the back, thus forming grooves along the back in the space between the adjacent signatures, and after the gluing operation has been performed, the back is usually rounded in accordance with common practice prior to the application of the backing. In some instances, of course, the signatures may be sewed together by what is termed "side sewing," and this may be performed prior to the gluing operation, or may be performed after the gluing operation but before the rounding and backing.

The operation of gluing the book backs has heretofore been quite a tedious and a relatively slow operation, and it is an important object of the present invention to simplify the gluing of book backs, and to enable such gluing to be performed at a relatively high rate of speed while at the same time insuring uniformity and accuracy in the finished product.

The gluing of book backs has been accomplished through the use of different types of adhesives, and one such adhesive is an animal glue that has a plasticizer added thereto. There has also been considerable experimentation and some actual gluing accomplished with synthetic adhesives such as resins, and these synthetic adhesives have, in the trade, been termed "hot melts." Another object of the present invention is to enable such gluing operations to be performed with either type of adhesive and to enable this to be accomplished in a single machine without any material alterations in the machine. Related objects are to afford means in such a book back gluing machine which is effective where "hot melts" are used to quickly set such adhesive and dissipate the heat so that the book back gluing operation may be performed at a relatively high speed, and to afford this means in a form such that undesired adhesion is avoided where the relatively slow setting animal glues are employed.

In the operations involved in gluing book backs, it has been quite troublesome to attain proper positioning of the several signatures that are to be glued together to form each book, and another important object is to enable the signatures to be fed automatically into the gluing machine in groups and to enable the signatures included in each such group to be readily shifted and positioned one with respect to the other so as to insure accuracy and uniformity in the finished product. A related object is to enable such automatic feeding of the groups of signatures and such positioning or aligning of the signatures of such group with respect to each other to be readily and easily attained, and to accomplish this at a relatively high rate of speed in such a way that the operations may be performed by mechanism of a character that may be simply and easily maintained.

Where a high speed book back gluing machine is to be utilized, it is important that the machine be capable of handling books of different thicknesses and that the machine be so arranged to enable the machine to be set quickly and easily for any different thickness of book, and to enable this to be accomplished is another important object of the present invention.

When glue has been applied to the back of the book, the brushing operation which removes the excess glue is quite important, and another object is to enable this brushing operation to be performed accurately and without transferring glue to the end edges of the books. More specifically, it is an object of this invention to enable the brushing operation of the aforesaid character to be performed on the books that are moving rapidly through a machine and to enable this brushing operation to be performed and controlled in such a way that proper operation of the machine on books of different sizes is assured.

In the application of glue to a book back, it is, of course, important to apply the glue in a proper amount, and to enable the amount of glue applied to each book to be rapidly and easily adjusted and controlled is still another object of the present invention.

Other and further objects of the present invention will be apparent from the following description and claims and are illustrated in the accompanying drawings which, by way of illustration, show preferred embodiments of the present invention and the principle thereof and what we now consider to be the best mode in which we have contemplated applying that principle. Other embodiments of the invention embodying the same or equivalent principle may be used and structural changes may be made as desired by those skilled in the art without departing from the present invention and the purview of the appended claims.

In the drawings:

Fig. 1 is a perspective view of a book back gluing machine embodying the features of the present invention, a series of books being illustrated in position in the machine and in different steps of completion;

Fig. 2 is a plan view of the machine;

Fig. 3 is an end view of the input end of the machine, the view being taken substantially along line 3—3 of Fig. 2 and being at an enlarged scale;

Fig. 4 is a fragmentary plan view of the input end of the machine, the view being taken at a larger scale;

Fig. 4-A is a schematic perspective view illustrating an intermittent clutch utilized in the operation of the supply magazine;

Fig. 5 is a side elevational view of the part of the machine shown in Fig. 4, the view being taken substantially along the line 5—5 of Fig. 4;

Fig. 6 is a fragmentary plan view of the rear edge jogger mechanism;

Fig. 7 is a vertical sectional view taken substantially along line 7—7 of Fig. 6;

Fig. 8 is a fragmentary side elevational view taken from the left in Figs. 6 and 7 and illustrating details of the rear edge jogger;

Fig. 9 is an end elevational view somewhat similar to Fig. 3 and taken partially in section along the line 9—9 in Figs. 4 and 5, but showing the books in their operative relationship with respect to the book feeding mechanism;

Fig. 10 is an enlarged fragmentary side elevational view illustrating the way in which the books are advanced from the book feeding mechanism toward the gluing mechanism;

Fig. 10-A is a vertical view showing a portion of the mechanism in Fig. 9 at an enlarged scale;

Fig. 11 is a side elevational view of a portion of the chain shown in Fig. 10;

Fig. 11-A is a sectional view taken along a line parallel to the plane of Fig. 11, but spaced between the side edges of the chain;

Fig. 12 is a plan view of one end of the supporting and clamping conveyor which receives the books from the feed chain and moves such books past the glue applying and brushing mechanism;

Fig. 13 is a side elevational view of the mechanism shown in Fig. 12;

Fig. 13-A is a plan view showing an alternative back-up means for the clamping conveyor;

Fig. 13-B is a sectional view taken along the line 13-B—13-B of Fig. 13-A;

Fig. 14 is a plan view of the delivery end of the clamping conveyor;

Fig. 15 is a side elevational view of the mechanism shown in Fig. 14;

Fig. 16 is a fragmentary plan view of the adjusting means for the clamping conveyor;

Fig. 17-A is a side elevational view taken along the line 17—A—17-A of Fig. 16;

Fig. 17 is a sectional view taken along the line 17—17 of Fig. 17-A;

Fig. 18 is a plan view of the final delivery mechanism which received the glued books from the clamping conveyor;

Fig. 19 is a side elevational view of the mechanism shown in Fig. 18;

Fig. 20 is a vertical sectional view through the glue pot mechanism and illustrating the relationship of the glue applying means, the brushing mechanism and the clamping conveyor;

Fig. 21 is an enlarged fragmentary view illustrating the way in which the glue is applied to the backs of the signatures that make up a book;

Fig. 22 is a view showing a plurality of signatures in the relationship in which they are delivered by the feed belt to the clamping conveyor; and Fig. 23 is a diagrammatic view showing the way in which glued books may be stagger-piled when animal glues are being used.

For purposes of disclosure, the invention is herein illustrated as embodied in book back gluing machine 30 into which assembled groups of signatures S, Figs. 21 and 22, may be fed in groups that are to constitute books B, Figs. 1, 9, 10 and 22, so that as the groups of signatures are advanced through the machine, they may have glue 31 applied thereto and properly brushed so as to take the form shown in Fig. 21, thereby to glue the signatures together to form the books B.

The machine 30 comprises an elongated table-like frame F at one end of which a supply magazine M is provided into which groups of signatures S may be introduced, and in the course of operation of the machine, as will hereinafter be described, each group of signatures S that is to constitute a book B is withdrawn from the rear end of the magazine and is forced downwardly into position upon advancing or feeding means which, as will hereinafter be described, are effective to impart a jogging action to the several signatures S so as to thereby place the folded lower edges thereof in a common plane. While such vertical jogging forces are being applied to the books, additional means are effective to apply horizontal jogging forces that are applied to the rear edges of the books to align the signatures in this direction. Such feeding or advancing means serve to discharge the books in succession into position between a pair of opposed clamping conveyors 35 which engage opposite sides of the book to maintain several signatures S in the proper relationship to each other after the book has been moved off of the end of the initial feeding means. The clamping conveyors 35 thus hold the book in assembly relation while exposing the lower or folded edges of the signatures S, and as advancing movement of the books B is continued, these books B move successively into position over a glue applying and brushing unit 38 that is illustrated in detail in Fig. 20 of the drawings. The arrangement is such that glue is applied to the folded lower edges of the signatures S, and the book then moves into position over the brushing mechanism of the unit 38, and when this has taken place, the brushing means are automatically moved upwardly and into contact with the glued lower edge of the book so that the glue is properly brushed as the advancing movement of the book takes place.

After passing the gluing and brushing unit 38, the books B continue their advancing movement between the clamping conveyors 35, and at the opposite ends of such clamping conveyors the books are discharged onto a delivery conveyor unit 40 which is effective to apply water to the glued edge of the book, thereby to prevent sticking of the book to the conveyor in the event that animal glue has been used, or to cause rapid cooling of the glue in case a synthetic glue has been used. From the delivery conveyor unit 40, the books are discharged onto or toward a final stacking table 41 where an operator removes the books and places them in stacks or the like in preparation for the next operation.

Because of the nature of the various driving connections in the present machine, the construction and operation of the clamping conveyors 35F and 35R will first be described. Thus, the details of the clamping conveyors are illustrated in Figs. 12 to 15, and in these figures it will be evident that the frame F comprises three main uprights 44, 45 and 46. The upright elements 44 and 45 are spaced longitudinally of the machine and serve as supports for horizontally extending mounting frames 47F and 47R that support the clamping conveyors 35R and 35F. Thus, the upper faces of the uprights 44 and 45 are formed as flat mounting surfaces 48, and the mounting frames 47R and 47F rest upon and are secured to these two mounting surfaces 48. Each of the frames 47R and 47F is relatively long and rigid in character, and the mounting frame 47R carries a driving pulley 50R adjacent to its right-hand end as shown in Fig. 14. Adjacent to the left-hand end of the mounting frame 47R, an idler pulley 51R is mounted, and the pulleys 50R and 51R have a relatively wide, endless steel belt 52R extended thereabout. The idler pulley 51R is mounted on a yoke 53R that is mounted in turn for endwise sliding movement in a bracket 54R that extends to the left from the left-hand end of the mounting frame 47R, and a spring 55R acts on the yoke 53R to maintain the belt 52R under tension between the two pulleys. The mounting of the idler pulley 51R is arranged with an adjustment structure 56R at the upper end of the pulley, thereby to enable the vertical axis of the pulley 51R to be adjusted so as to attain proper tracking of the belt 52R about the pulleys 50R and 51R.

The forward mounting frame 47F is similarly provided with a driving pulley 50F and an idler pulley 51F about which an endless steel belt 52F is extended, and the mounting of the idler pulley 51F is in all respects similar to the mounting on the idler pulley 51R.

The rear mounting frame 47R is permanently fixed in a predetermined relationship on the mounting surfaces 48, and this is accomplished by means of clamping bolts 58R that extend through the mounting frame 47R and into the supports 44 and 45.

The forward mounting frame 47F is, however, arranged for adjustment from front to rear of the machine so that the distance between the two adjacent runs of the belts 52R and 52F may rapidly be adjusted, for properly clamping books of different thickness, as will hereinafter be described, and to enable this to be accomplished, the mounting frame 47F has releasable clamping bolts 58F extended downwardly therefrom through slots 59 that are formed in the mounting surfaces 48, and hence when the bolts 58F are released, the mounting frame 47F may be adjusted from front to rear and may then be clamped in any desired position by tightening of the clamping bolts 58F.

In the present instance the clamping forces that must be applied by the adjacent runs of the belts 52F and 52R to the opposite faces of the books B are quite substantial, and to enable such forces to be applied without necessitating undue tightness or tension on the belts, the adjacent runs of these belts are arranged to run against upstanding back-up plates 60F and 60R that are formed as upwardly extending flanges on the frames 47R and 47L. The faces of the back-up plates 60F and 60R are covered by strips of molded bearing material 61F and 61R, thereby to avoid objectionable heating due to friction caused by the rapidly moving belts.

The adjustment of the front frame 47F is in the present instance attained by means including an operating hand wheel 62 that is fixed on the forward end of an adjusting shaft 63. This adjusting shaft is arranged at its rear end in a mounting bracket 64 so as to be held against endwise movement, and in its forward end portion, adjacent to the hand wheel 62, a screw threaded section 64T is formed, this screw threaded section being engaged with a nut 65, Fig. 16, that is afforded on the frame 47F adjacent to the forward edge of the frame 47F. In this connection it should be noted that the shaft 63 is disposed in position over the supporting frame 45, and a similar adjusting shaft 66 is provided over the upright support 44. This shaft 66 has a similar screw threaded portion that engages a nut 67 formed on the forward mounting frame 47F. The two adjusting shafts 64 and 66 are arranged to be operated in unison by means including an endless connecting chain 70 that extends about sprockets that are mounted on rear ends of the shafts 64 and 66.

When the forward conveyor 35 is being adjusted from front to rear, it is desirable that it be arranged to exert a predetermined clamping pressure on the books that are to be passed between the two clamping conveyors, and to enable this to be accomplished in a simple manner, the hand wheel 62 is connected to the shaft 63 by an overload release drive connection 72, Figs. 17 and 17-A, which allows only a predetermined amount of force to be applied to the shaft 63. Thus, in adjusting the machine, several books are placed between the two conveyor belts 52R and 52F, and the hand wheel 63 is actuated until the overload clutch 72 starts to slip. The forward frame 47F is then clamped into position by the tightening of the clamping bolts 58F. In affording the overload clutch 72, as shown in Figs. 17 and 17-A, a sleeve 73 is keyed at 73K onto the forward end of the shaft 63, and the hand wheel 62 has a central hub 62H that is rotatably supported on the sleeve 73 between an integral outer flange 73F and a hardened steel plate 74 that is fixed as a flange to the rear end of the sleeve 73 by means of cap screws 75. The hub 62H has a plurality of rearwardly opening spring pockets 76 formed therein at circumferentially spaced points, and detent balls 77 in the pockets 76 are urged rearwardly and into engagement with the plate 74 by springs 77S contained in the pockets 76. The balls 77 are thus engaged with cone-shaped recesses 78 formed in the plate 74 at a spacing which corresponds to the spacing of the pockets 76. Hence, the engagement of the balls 77 with the recesses 78 will normally transmit the rotative movements of the hand wheel 62 to the shaft 63, but the strength of the springs 77S is so chosen that when the conveyor position is being adjusted to apply clamping pressure to a book, the drive 72 will release when the proper clamping pressure has been applied to such book.

The pulleys 50R and 50F are constantly driven during the operation of the machine from the drive motor 43 which is disposed on the base 80 of the machine just to the left of the upright support 45, as shown in Figs. 14 and 15. The motor 43 serves to drive a speed reducing unit 43S which has an output shaft that has a sprocket 81 thereon from which a chain 82 extends past an adjustable idler sprocket 83 and about a relatively large sprocket 84 that is fixed on a shaft 85, this shaft being horizontally positioned so as to extend across the top of the upright support 46 directly beneath the axes of the pulleys 50R and 50F. The shaft 85 is supported at its rear end by a bracket 87, while at its front end a supporting bracket 88 is provided, these brackets being carried respectively on the frames 47R and 47F. The shaft 85 is arranged to drive the pulleys 50R and 50F in opposite directions, and these pulleys, as shown in Figs. 2 and 15, are supported on vertical shafts 89F and 89R that are in turn supported on upper and lower brackets 90 and 91 that are fixed on the respective frames 47R and 47F. At the lower ends of the shafts 89F and 89R, bevel gears 92F and 92R are fixed, and the bevel gear 92R is arranged forwardly of and in a meshed relationship with a bevel gear 93R that is keyed onto the shaft 85. The bevel gear 92F is arranged rearwardly of and in a meshed relationship with respect to the bevel gear 93F that is splined onto the shaft 85, and these bevel gears 93F and 93R are so related to the bearings 87 and 88 that the bevel gears are maintained in a meshed relationship with the bevel gears 92 by such bearings.

The forward pressure conveyor 35 is arranged, as hereinbefore described, for adjustment from front to rear, and in the course of this adjustment, the bevel gear 93F is held between the gear 92F and the bearing bracket 88 so that the gear 93F moves along the shaft 85 by reason of its splined mounting thereon and the driving connection is thereby maintained for the pulley 50F.

At its rear end, the shaft 85 has a bevel gear 95 fixed thereon, and this bevel gear is in a meshed relationship with the bevel gear 96 that is fixed on a horizontal transmission shaft 97 which is supported in a bearing 98 that extends rearwardly from the upright support 45. The bearing bracket 98 also has a bearing for the rear end of the shaft 85 just rearwardly of the bearing 87. The transmission shaft 97 extends to the left along the rear side of the machine as shown in Figs. 1, 2, 12, 13 and 14, and at its left-hand end the shaft 97 is supported in a bearing bracket 99 that is fixed on the upright support 45 so as to extend rearwardly therefrom. A bevel gear 100 fixed on the shaft 97 adjacent to bearing bracket 99 is meshed with a bevel gear 101 that is fixed on a forwardly extending shaft 102, Figs. 12 and 13, that is utilized as a source of power for driving the glue applying mechanism of the unit 38 and also for driving other mechanisms, including the book feeding mechanism associated with the magazine M, and the feed conveyor whereby the jogging action is applied to the books as they are advanced unto the clamping conveyors 35F and 35R. As shown in Fig. 1, the bevel gear connections 95 and 96 are enclosed by a protective housing 103, while the bevel gear connection afforded by the gears 101 and 102 is enclosed by a protective housing 103A. Similarly, as shown in Fig. 1 of the drawings, the chain connection 70 is housed by a removable casing 105.

In respect of many books that are to be glued on the present machine, it will be obvious that the width of the books may be such that only a relatively small lower portion of the book will be clamped between the aforesaid clamping conveyors, and, as will be evident in Fig. 1 of the drawings, a pair of stationary guide bars 107F and 107R are mounted on the casings 106F and 106R so that they may engage opposite side faces of the books B above the tops of the casings 106F and 106R. These guide bars 107F and 107R are adjustably supported so that they may be set in different vertical locations in accordance with the vertical size of the books B that are being glued, and for this purpose a pair of opposing vertical mounting rods 108F are fixed on the frame 47F, and brackets afforded on the guide bar 107F surround these opposing rods 108F and are adapted to be secured in any vertically adjusted position along the rods by means including wing-headed screws 109F. Similarly, the rear frame 47R has a pair of opposing vertical rods 108R, and brackets on the rear guide rod 107R embrace these opposing rods, and are adapted to be clamped in any position by means including wing-headed set screws 107R.

As hereinabove pointed out, the constantly driven shaft 102 is utilized to afford driving power for the feeding mechanism that is associated with the magazine M and with the feeding mechanism that transports the individual books from the feeding mechanism to the clamping conveyors 35F and 35R. Thus, the shaft 102 has a gear 130, Figs. 12 and 13, fixed thereon that is meshed with a somewhat smaller gear 131 that is disposed upwardly and somewhat to the left of the shaft 102 as viewed in Figs. 12 and 13. The gear 131 is mounted on a horizontal shaft 133 that is carried at its rear end in a part of the bracket 99 and at its forward end such shaft is supported in a bracket 134. The shaft 133 serves as a support for a pair of sprockets 135 that in the present instance are fixed on the shaft so as to be disposed almost directly beneath the adjacent runs of the belts 52R and 52F. These sprockets 135 act as a driving means for a feed conveyor 136 that is made up of a pair of spaced, roller-type chains 135R and 135F. These two chains extend to the left in Fig. 13 and to the right as viewed in Fig. 5 so as to extend about other sprockets 137 that are fixed on a transverse shaft 138. The shaft 138 is disposed in an extension frame 139 that extends from the main frame F and is braced by means including upwardly extending arms 140. As shown in Figs. 7 and 9, the extension frame 139 includes a pair of spaced members 139R and 139F, and these two members form vertical rails along the upper edges of each of the two chains 135R and 135F are adapted to ride. The arrangement is such, however, that the chains 135R and 135F are given a rapidly reciprocating motion through a relatively short stroke in vertical direction in the course of their movement along the upper portions of the frame members 139R and 139F, and for this purpose each of these two frame members has a corrugated track 145R and 145F, Figs. 7 and 10, fixed thereon so as to engage the rollers of the respective chains. The corrugations of the two tracks are somewhat in the nature of sine wave curves so that in the course of rapid movement of the two chains, the chains will be given a rapid vibration in a vertical direction.

The two chains are connected by transverse carrier rods 146, as will be evident in Figs. 7, 10, 11 and 11-A, so that between the two chains a support may be afforded upon which books may be carried. These books B, of course, comprise a plurality of independent signatures S, as will be evident in Figs. 10 and 10-A, and hence the signatures must be held together during the time when they are advancing on the feed chain 135 from the magazine M and into the bight of the pressure conveyors. Thus, as will be evident in Figs. 4 and 5, guide members 150F and 150R are afforded above the feed chain 135 and between the magazine M and the adjacent end of the pressure conveyors. As shown in Fig. 4, the rear guide members 150R are supported in what may be termed a fixed transverse position in that they bear a particular relationship with respect to the rear pressure conveyor 35R, but it will be noted that these guide members 150R, Fig. 5, may be set in different vertical positions along vertical supporting posts 150P. The forward guide member 150F, however, is supported in upstanding brackets 151 by means including horizontal adjusting screws 152 whereby the front side plate may be adjusted laterally of the feed conveyor 135 to attain the desired relationship with respect to the forward pressure conveyor 35F when this pressure conveyor has been disposed in the desired adjusted relationship.

The magazine M as herein shown is afforded by a horizontal supporting plate 155 which extends forwardly from a point adjacent to but spaced from the forward edge of the feed conveyor 135 and the supporting plate 155 has a pair of adjustable side guides 156 thereon so that groups of signatures S may be put in position on the supporting plate 155 for feeding movement along supporting plate 155 and into position over the feed conveyor 135. Thus, as will be evident in Figs. 2, 3, 4 and 5, the support plate 155 is carried in part from the frame member 139F by means including a bracket 157, Fig. 9, and at its other or forward end a pair of supporting legs 158 is afforded as shown in Figs. 2 and 3. A plurality of endless feed belts 155B are extended across the top of the supporting plate 155 between the guides 156, and at the forward end of the platform or supporting plate 155 a shaft 159 is mounted by means of brackets 160, and this shaft has a plurality of pulleys 161 thereon over which the feed belts 155B are extended. At its rear end, and between the end of the platform 155 and the frame 135F, another shaft 164 is mounted, and this shaft has a plurality of drive pulleys 166 fixed thereon and over which the feed belts 155B extend. Thus, upon actuation or advancing movement of the belts 155B, the groups of signatures in the magazine M may be advanced along the supporting plate 155 and toward a position over the feed conveyor 135. As such forward movement progresses, the leading group of signatures S is moved outwardly onto a plurality of projecting arms 168 that extend in a rearward direction from the supporting plate 155 so as to form an effective extension thereof. These arms 168 are arranged to terminate substantially in the plane of the forward guide member 150F, and the rear guide members 150R serve as an abutment against which the advancing group of signatures may be positioned. The arrangement is such that when the leading side face of the group of signatures engages such stop means, all of the signatures that are to constitute a book B are positioned beyond the ends of the arms 168, thereby to be in position for downward movement onto the feed conveyor 135. Thus, after the signatures in the magazine M have been advanced into abutment with the guide members 150R, the group of signatures that is to constitute a book B are moved downwardly into engagement with the feed conveyor 135.

When a book B is to be moved downwardly into engagement with the feed conveyor, this is accomplished by means of a feed plate 170 that is adjustably carried on the forward ends of a pair of rocking arms 171. These rocking arms 171 are supported at their rear ends by a pivot shaft 172, which is in turn carried in bearings 173 that are fixed on the mounting posts which support the rear guide members 150R. The rocking arms 171 may be actuated through rocking movements so as to move the plate 170 between the upper position shown in dotted lines in Fig. 9 and the lower or actuated position shown in full lines in Fig. 9. This is accomplished by means including a vertical operating rod 175 that is extended upwardly through a pivot block 176 carried on an arm 177 which, as shown in Fig. 4, is fixed on the pivot shaft 172. The rod 175 may be fixed in any desired relation with respect to the pivot block 176 by means including a wing nut 176N. The rod 175 extends downwardly through a guide bracket 179 and a lower guide bearing 180, and at its lower end the rod 175 has a cam roller 181 fixed thereon. A spring 182 surrounds the rod 175 below the guide bracket 179 and acts between this guide bracket and a collar 183 fixed on the rod 175 to urge the rod downwardly and thus maintain the roller 175 in engagement with an adjustable, single lobe cam 185. This cam 185 is carried at the rear end of a mounting sleeve 186 which is rotatably supported on a stub shaft 187 that is in turn carried on a bearing bracket 188 fixed to the rear surface of the frame member 139R. The sleeve 186 carries a sprocket 190 at its rear end whereby the cam 185 is driven in timed relation to the other parts of the machine, as will hereinafter be described.

When a book B has moved beyond the supporting arms 168 and has been shifted downwardly onto the supporting rods 146 of the feed chains, the rear or trailing edge of the book is engaged by feed lugs 195, shown in Fig. 10 of the drawings. Similar feed lugs 195 are afforded at spaced points along the feed conveyor. These feed lugs are preferably formed as illustrated in Figs. 11 and 11-A of the drawings by providing upper and lower blocks 195U and 195L that are arranged to partially embrace adjacent cross rods 146, as shown in Fig. 11-A, and a fastening screw 196 is passed upwardly through the lower one of these blocks and is threaded into the upper block so as to clamp the opposed blocks into position on the chain. As soon as the trailing edge of the newly fed book B has been engaged by a feed lug 195, this book is advanced to the right in Fig. 4 toward the adjacent end of the clamping conveyor mechanism. In the course of this advancing movement, the book is not only subjected to the vertically applied jogging forces that result from the action of the rails 145, but this book is also subjected to resiliently applied downward forces, and to jogging forces applied to the rear edges of the signatures, so that prior to the time when the book reaches the clamping conveyor, the several signatures will have been located in a properly aligned relationship.

The downward forces that are applied to the upper edges of the signatures are attained through the use of spring means, and to this end, a horizontal mounting plate 200 is supported on adjustable brackets 201 from the upper guide member 150R, as will be evident in Figs. 4 and 5 of the drawings. The mounting plate 200 is arranged to overlie the path of the advancing books in the space between the feed plate 170 and the adjacent end of the clamping conveyor. On its lower face, the mounting plate 205 has a plurality of spring arms 202 that extend downwardly and in an advancing direction, or, in other words, to the left as viewed in Fig. 5. These arms are spaced longitudinally of the mounting plate 200, and thus the upper edges of the several signatures of a book are engaged yieldingly by these spring arms 202 in succession as the book advances from the magazine M to the clamping conveyors.

The jogging forces that are applied to the rear edges of the book B are attained through the use of a rear edge jogger mechanism 210 that is shown in detail in Figs. 6 and 7, and that is shown in its association with the other elements of the machine in Figs. 2, 4 and 5 of the drawings. This rear edge jogger mechanism 210 comprises an elongated jogger arm 211 that is so mounted and actuated that as a book B is moving forwardly with the feed conveyor 135, the jogger arm 211 is moved transversely of the feed conveyor and into position behind such book B, and then is moved forwardly or in an advancing direction so as to engage the rear edge of the book and apply vibrating or jogging movements to these rear edges in an advancing direction. After such rear edge jogging movements have been applied to the book for a substantial distance of advancing travel, the jogger arm 211 is withdrawn laterally from its position behind the book and is returned to its initial position so that it may be effective in the same manner upon the succeeding book B.

Thus, as shown in detail in Figs. 6 and 7 of the drawings, the jogger arm 211 is mounted on and actuated by a pair of operating chains 215 and 216, both of which are of endless form, as will be evident in Fig. 6. These chains 215 and 216 are of the roller bearing type, and are mounted in a common horizontal plane just rearwardly of the feed conveyor 135. The chain 215 is supported at its opposite ends by a driven sprocket 215A and an adjustable idler sprocket 215B that are disposed on vertical axes which are spaced in equal amounts from the line of travel of the feed conveyor.

Thus, the chain 215 is supported between the two sprockets 215A and 215B so that two relatively long runs of the chain between the two sprockets are parallel to the path of movement of the feed conveyor. These two runs of the chain are guided by means including a guide block 215C, disposed between the two sprockets and engaging the straight runs of the chain on the internal surfaces thereof.

The chain 216 is similarly supported on a drive sprocket 216A and an adjustable idler or take-up sprocket 216B that are mounted on vertical axes rearwardly of the chain 215 so that the straight runs of the chain 216 will also be parallel to the path of the feed conveyor. A similar intermediate block 216C is disposed between the two runs of the chain 216 to maintain these runs of the chain in straight line paths between the two mounting sprockets. It will be observed that the two sprockets that support the chain 216 are disposed in positions somewhat in an advancing direction with respect to the sprockets that support the chain 215. In other words, as viewed in Fig. 6, the advancing direction of the feed conveyor is indicated by an arrow, and the offset of the chain 216 with respect to the chain 215 is in the advancing direction that is thus indicated.

The two chains 215 and 216 are driven in unison or, in other words, at the same speed, so that the runs thereof that are adjacent to the feed conveyor move in the advancing direction above described. Thus, the drive sprockets 215A and 216A are fixed, respectively, on vertical shafts 215S and 216S that are rotatably supported in a mounting block 220 so as to extend downwardly beneath this block. These shafts have drive gears 215G and 216G fixed thereon near their lower ends, and these gears are interconnected by an idler gear 221 that is supported beneath the mounting block 220. The shaft 216S has a bevel gear 222 fixed thereon beneath the gear 216G, and this bevel gear is meshed with a bevel gear 223 that is rotatably supported on a bearing sleeve 224 and a stub shaft 225 disposed on a rearwardly projecting horizontal axis in the mounting block 188. The bevel gear 223 has a drive sprocket 226 fixed thereon, as shown in Fig. 7, so that the rear edge jogger unit 210 may be driven in timed relation to the other elements in the machine, as will hereinafter be described.

The jogger arm 211 is mounted on the two chains 215 and 216 as best shown in Figs. 5 and 6 so that the jogger arm is actuated through the desired cycle of movement as hereinabove described. For this purpose, the jogger arm 211 has an elongated slot 211S formed longitudinally thereof, and this slot is arranged to slidably embrace an upwardly extending mounting bolt or stud 230 that is afforded as an extension of one of the connecting pins of the chain 215. Above the arm 211, a washer 231 is positioned about the stud 230, and a nut 232 holds the washer 231 against undesired upward displacement. The arm 211 also extends in a rearward direction to a point over the chain 216, and a similar stud and washer arrangement 234 is afforded as an extension of one of the pivot pins of the chain 216, this stud and washer arrangement 234 also being arranged in a similar manner in respect to the slot 211S. An anchoring pin 235 extends upwardly from the arm 211 adjacent to its rear end, and a tension spring 236 extends between this stud 235 and an upward extension 237 of the stud 230. Thus, the spring 236 normally acts to yieldingly urge the arm 211 in a forward direction until the left-hand end of the slot 211S engages the stud 234, and this yielding force, applied to the arm 211, functions in causing the arm 211 to have a vibrating motion, as will be hereinafter described. In this respect, it may be pointed out that at its right-hand or forward end, the arm 211 has a relatively narrow tooth 211T projecting longitudinally therefrom, and this tooth is adapted to engage a saw tooth rack 240 that extends longitudinally along the forward side of the feed conveyor. This rack 240 is carried in a mounting bar or housing 241 that is adjustably supported by screw and nut devices 242 and brackets 243 so that the housing 241 may be adjusted from front to rear with respect to the feed conveyor. The rack 240 is arranged so that it is urged yieldingly in a forward direction to an extent that is limited by a pair of overhanging shoulders 241S disposed adjacent to the ends of the housing 241. The forward yielding force is afforded by a leaf-type spring 244 that is disposed within the housing 241 so as to urge the rack 240 in a rearward or left-hand direction, as viewed in Fig. 6. With the rack 240 thus positioned, the tooth 211T is arranged to ride along and across the several teeth of the rack as the arm 211 moves in an advancing direction along the feed conveyor, and this causes the arm 211 to vibrate somewhat in a direction parallel to the path of movement of the feed conveyor, and thus a jogging action is attained in respect to the rear or tailing edge of the book that is at this location on the conveyor.

In Fig. 6 of the drawings, the path of movement of the jogging arm 211, as it enters into position behind a book, and as it is withdrawn from such position, has been indicated by series of dotted lines that have been numbered in succession, and the location of the right-hand ends of such numbered lines will serve as an indication of successive locations of the end portion of the jogging arm 211. Thus, in respect to the forward or entering movements of the jogging arm 211, it will be noted that by reason of the offset endwise location of the two chains 215 and 216, the arm 211 is disposed in a slightly angular relation as it starts its entering movement. This position has been indicated by the numeral "1," and successive positions have been indicated by the numerals "2" to "7," inclusive. A comparison of these successive positions shows that as the arm 211 enters in a transverse direction over the conveyor, it also moves in an advancing direction. and just after it reaches the position indicated by the numeral "7," it will engage the book B, and will shortly thereafter become engaged with the rack 240 so as to have jogging or vibrating movements applied thereto. The timing and arrangement of the parts is such that the jogging arm 211, in its advancing movement, actually advances the book B slightly with respect to the lug 195 that is disposed rearwardly of the book, and hence the jogging action of the arm 211 is rendered effective to the maximum degree. When the jogging action has been applied for a considerable length of travel along the feed conveyor, the arm 211 starts upon its withdrawing cycle of movement. Several successive positions through which the jogging arm 211 moves in this cycle have been indicated by numbered lines from "7" to "14," and it will be noted in respect to this withdrawing cycle of movement that the arm 211 first is withdrawn in a retracting direction, or in other words, in a direction opposite to the aforesaid advancing direction, and thereafter it assumes an angular position as it is withdrawn in a rearward direction to the relationship shown by numbered line "14." The withdrawing movement, of course, proceeds beyond that indicated by the numbered line "14" and the arm 211 is subsequently returned through the position indicated by the numbered line "1" so that it may proceed with the next entering and jogging operation, which will be the same as that above described.

As the book is further advanced after the aforesaid rear edge jogging by the unit 210, it is moved into the bight of the clamping conveyors so as to be clamped therebetween for further advancing movement, and as will be evident in Fig. 20 of the drawings, the clamped relationship of the books B between the clamping conveyors is such that the lower edges of the book, which are to be glued, are disposed somewhat below the lower edges of the belts 52F and 52R of the clamping conveyors. After a book B has been clamped between the clamping conveyors, the lug 195 is caused to be retracted gradually downwardly and out of contact with the book B, as shown in Fig. 13, this being accomplished by a gradual downward taper on the upper surfaces of the rails 145, which in the area opposite the clamping conveyors, have smooth upper surfaces.

Somewhat beyond the right-hand end of the feed conveyor 136, as viewed in Fig. 12, and after the books have been firmly clamped between the clamping conveyors, the books are moved across the glue applying and brushing unit 38, which is shown in detail in Figs. 12, 13 and 20 of the drawings. This gluing and brushing unit embodies a liquid-jacketed glue pot 250 that opens upwardly and is provided with a liquid chamber 250C, which surrounds the side walls and extends beneath the bottom of the glue receiving internal chamber 252, it being noted that this internal chamber is provided with a bottom drain opening 253 that extends downwardly through the liquid chamber 250C and is closed by a removable plug 254. The glue pot 250 is provided with a plurality of relatively large tubular type electric heaters 255 that extend into the forward and rear sides of the glue pot so as to be disposed within the chamber 250C, thereby to be effective to heat the liquid that is provided within this chamber. The glue pot 250 is supported, as will hereinafter be described in some detail, so that a glue applying wheel 260 that is mounted therein on a horizontal axis may engage at its upper edge with the lower edges of the books B as they are moved over the glue pot by the clamping conveyors. The glue applying wheel 260 is mounted on a horizontal shaft 261 that extends through a bearing 262 formed in the rear side wall of the glue pot, and on the extending rear end of this shaft, a drive gear 264 is afforded for imparting rotation to the glue wheel 260, as will hereinafter be described.

The glue wheel 260 is rotated in a clockwise direction as indicated by the arrow in Fig. 20, and the amount of glue that is applied to the books is governed by a scraper blade 265 that is pivoted on a horizontal shaft 266 adjacent the left-hand end edge of the glue pot as viewed in Fig. 20. This scraper 265 has its right-hand end positioned over the glue wheel 260 just to the left of the highest point of the glue wheel, as viewed in Fig. 20, and by its spacing from the glue wheel 260, this scraper governs the amount of glue that is to be applied to the books B. This spacing of the scraper may be readily adjusted, and this is attained by means of a positioning arm 268 that is fixed on the shaft 266 and extends downwardly along the forward edge of the glue pot. At its lower end, this arm 268 has a stationary bolt 270 extended therethrough, and a spring 271 surrounding the bolt between the arm 268 and the heated right-hand end of the bolt 270 serves to urge the arm 268 in a clockwise direction, such movement along the bolt 270 being limited by an adjustable stop nut 272. The bolt 270 is supported by threading the same through a stationary lug 273 that is afforded on the forward face of the glue pot and a lock nut 274 is provided on the left-hand end of the bolt 270 to readily secure the same in position. It will be noted, of course, that the desired adjustment of the location of the scraper 265 may be attained either by adjustment of the stop nut 272 or by adjustment of the longitudinal position of the bolt 270, and in the latter case it would be necessary to release and then tighten the lock nut 274.

In order to assure continued proper operation of the scraper 265, this scraper is maintained in a heated condition at all times, and this is accomplished by means of an electric heater 275 that is supported in a mounting block 276 carried on the scraper 265 adjacent to the right-hand or effective end thereof.

It will be observed that the glue wheel 260 is located relatively close to the left-hand end portion of the glue pot 250, and after the glue has been applied to the lower edges of the books B, it is desirable to brush this glue so as to produce uniformity of application and prevent the use of an excessive amount of glue. This is attained through the use of a brush 280 which is of the wire-bristled, metal-backed type. The brush 280 is removably mounted in a holder 281, and this holder is pivoted on a horizontal shaft 282 that is disposed on the right-hand end wall of the glue pot 250, as will be evident in Fig. 20 of the drawings. The brush 280 has a metal back thereof so formed as to receive a transversely extending electrical heating element 283 whereby the brush 280 is maintained at such a temperature that glue will not harden thereon. The brush 280 normally tends by gravity to move to a downward or retracted position, as shown in Fig. 20 of the drawings, and after the forward edge of a book has been moved into position over the brush, this brush is caused to move upwardly into an engaged or brushing relationship with respect to the lower edges of the books. The required lifting force is in the present instance applied through a solenoid 285 that is operatively associated with the shaft 282 through an arm 286 that is fixed on the rear end of the shaft 282, as shown in Fig. 12 of the drawings.

The proper timing of the raising and lowering movements of the brush 280 is attained by sensing the individual books B as they move into position over the brush 280. Thus, as shown in Figs. 12, 13 and 20, a switch 288 is mounted on the rear frame 47R, and this switch has a sensing arm 290 associated therewith so that a sensing roller 290R carried on the end of the arm 290 projects into the path of the books B just above the belt 52R. The location of the roller 290R is so related to the brush 280 that the switch 288 is closed only after the leading edge of the book B has been moved into position over at least a portion of the bristles of the brush 280B.

This insures that the brush 280 will not contact the forward edge portions of the book and the undesired deposit of glue on these forward edges is thereby avoided. When the switch 288 is thus closed, the solenoid 285 is energized to attain the desired brush lifting action, and the arrangement is such that the roller 290R runs off of the rear end edge of the book so as to thereby open the switch 288 and drop the brush 280 at almost the exact time that the rear edge of the book B passes beyond the most right-hand bristles of the brush 280. This action is attained by locating the roller 290R directly over the most right-hand bristles of the brush 280.

The glue pot 250 under the present invention is so mounted and supported as to facilitate the filling and cleaning operations that must be performed, and also to facilitate the adjustment of the vertical location of the glue wheel 260. In affording such a mounting, a stationary mounting bed 295 is provided, as shown in Fig. 13 of the drawings, this bed 295 being extended to the right from the upright support 44 and being supported at its right-hand end by a relatively low supporting member 296. On the bed 295, a pair of stationary mounting rails 297 are fixed at spaced points so as to extend transversely across the bed 295 and so as to extend a substantial distance forwardly beyond the bed 295, as shown in Fig. 12 of the drawings. These extending mounting rails 297 are utilized to afford a movable support for the glue pot 250 so that the glue pot may be moved forwardly from its operating position and into a partially projecting forward position in which it may be readily adjusted, filled or cleaned. The glue pot 250 is mounted on the rails 297 through the use of a carriage formed by an intermediate flat base plate 300 which has downwardly projecting mounting block elements 301 along its opposite end edges. On these mounting block members, a plurality of rollers 303 are provided, and these rollers are arranged to engage guide surfaces of the supporting rails 297.

Thus, each rail 297 comprises bottom and top plates 297A and 297B and an intermediate plate 297C that are fixed together to afford laterally opening channels in which the rollers 303 are arranged to ride between the top and bottom plates. Stop pins 297S are mounted in the lower plates 297A adjacent the front and rear ends of the rails to limit the maximum movements of the glue pot along the rails. In addition, a retractable locking device 305 is afforded on one of the rails for locking the glue pot in its inner or rear position. The glue pot is, of course, supported on the base plate 301 in a manner to be presently described, and by rolling the base plate 301 in a front to rear direction, the desired movements of the glue pot 250 may be attained. This is accomplished in the present instance by affording a downwardly facing rack 310 on the base plate 301, which engages a pinion 311, this pinion being carried on a horizontal shaft 312 mounted in the bed 295. The shaft 312 extends to the right as shown in Figs. 13 and 20, and has an operating crank 313 fixed on its right-hand end just beyond the edge of the bed 295. By operation of the crank 313, the desired shifting movements may be applied to the glue pot in a front to rear direction.

The glue pot is supported on the base plate 301 by means of horizontal hinge means 315 that are disposed along the right-hand end edge of the structure, the two elements of the hinge being connected respectively to the glue pot 250 and the mounting lugs 301 of the base plate. Adjacent to the other or left-hand end of the glue pot, means are afforded for gradually raising and lowering such left-hand end of the glue pot to effectually raise and lower the glue applying wheel 260. In the present instance this is accomplished by a cam plate 320 that is pivoted on a horizontal axis 321 afforded on and below the base plate 300. The cam plate 320 has a cam slot 322 formed therein that is of arcuate form and located so as to be slightly eccentric with respect to the axis of the shaft 321. The cam slot 322 has a stud 323 extended therethrough, this stud 323 being fixed to or integral with the side wall of the glue pot 250. On the projecting threaded end of the stud 323, a wing nut 324 is provided so that by tightening the wing nut 324 the angular location of the cam plate 320 may be fixed. When it is desired to adjust the vertical location of the glue wheel 260, the wing nut 324 is loosened and the cam plate 320 is moved angularly through the use of a relatively long projecting handle 325 that is fixed to the cam plate. The degree of eccentricity of the cam slot 322 is relatively slight so that the desired adjustment of the vertical position of the glue wheel 260 may be adjusted with extreme accuracy.

After the lower edges of the books B have been glued and brushed as hereinabove described, the further advancing movement thereof by the clamping conveyors moves the books into position on a cooling and moistening belt 330, Figs. 18 and 19, which constitutes a portion of the unit 40 of the machine. In affording the unit 40 of the machine, a pair of longitudinal supporting beams 331 are supported at substantially the level of the shaft 85 and so as to project to the right for a substantial distance therefrom. This mounting and location of the beams 331 is afforded by a vertical standard 332 that is extended upwardly from the base 80 directly beneath the shaft 85, and by a pair of upwardly extending angularly disposed supports 333 that extend upwardly from the base 80 and are connected to the respective beams 331 a substantial distance to the right of the standards 332, as shown in Fig. 19. Adjacent to their right-hand ends, the two beams 331 are connected by a cross-plate 334. On each of the beams 331, a pair of mounting platforms are supported, such mounting platforms being identified as platforms 335F and 335R, and these platforms being extended slightly under the opposite edges of the upper run of the belt 330, which is supported in a manner that will be described presently. On the rear platform 335R, an upstanding guide rail 337R is adjustably supported by means including a pair of brackets 338R so that this bracket will serve as a lateral support for books that are moved to the right, Fig. 18, on the belt 330. A similar front guide rail 337F is similarly positioned, but with respect to the front guide rail 337F, a different mounting is afforded so as to facilitate adjustment of the space between the two guide rails to accommodate different thicknesses of books. Thus, a pair of spaced vertical shafts 339 are supported in bearing brackets 340 carried on the upper surface of the platform 335F. Each shaft 339 has an arm 340 fixed thereon which at its end is pivotally connected to a corresponding forwardly projecting bracket 341. The arms 340 are similarly positioned so that by equal rotative movements of the shafts 339, the side rail 337F may be adjusted with a parallel motion. This equal adjusting or rotating movement is applied to the shafts 339 by a link 343 that is connected between a pair of similar arms 344 fixed on the respective shafts 339 beneath the platform 335F. The adjustment that is attained by actuation of the link 343 may be preserved by any sort of lock-nut mechanism, but in the present instance, this lock-nut mechanism is in the form of a lock-nut 345 threaded on the right-hand shaft 339 and adapted to be locked against the related bracket 340.

The upper or conveying run of the endless belt 330 is supported at opposite ends by pulleys 350 and 351, the pulley 350 being mounted in a bracket 352, that is carried on the frame member 46. The other pulley 351 is carried in a pair of brackets 354, that are mounted on the respective beams 331 just to the right of the right-hand edge of the plates 335F and 335R. The belt is extended downwardly from the pulley 350 and beneath a guide pulley 356 that is supported in the bracket 352. From the pulley 356 the belt is extended to the right and beneath a relatively large pulley 357 that is supported in the brackets 358 extended downwardly from the respective beams 331. The belt is then extended upwardly about a pulley 359 which serves as an idler pulley, as will hereinafter be described, and from this pulley 359 the belt is extended to the left beneath and then around a drive pulley 360 which is mounted on a drive shaft 361 in brackets 362 carried on the upper face of the two beams 331. The belt 330 is then extended from the upper edge of the pulley 360 and along the lower edge of the pulley 351, thereby to complete the path of the belt. The pulley 359 is mounted on one end of a bell crank 364 that is centrally pivoted on the frame members 333, and a weight 365 is suspended from the other arm of the bell crank 364, thereby to apply a take-up force to the pulley 359 to keep the belt 330 in the properly tensioned relationship.

The pulley 357 is so supported that the lower edge thereof extends downwardly into a removable mounted pan 366 in which water may be contained, and hence, in the rotating movement of the pulley 357, the belt 330 is passed the water contained in the pan 366. The belt 330 is preferably made from a fabric material such as canvas and serves to carry an appreciable amount of water as it moves out of the pan. The amount of water carried upwardly onto the upper run of the belt is governed and controlled by what amounts to a pressure roller 368 that is mounted in opposed relation to the pulley 356, it being noted that both of these pulleys are disposed over the left-hand end of the pan 366 so that any wringing action will cause the water to drop back into the pan 366. The belt 330 is thus maintained in a wet condition at all times, and by passing the same through the water in the pan 366, the belt is maintained relatively cool. Hence, when a book that has been glued with a hot melt adhesive is passed into position on the belt 330, the water on the belt serves as a cooling medium so that by the time the book has been moved to the right-hand end of the belt 330, and is ready for discharge onto the collecting platform 41, the adhesive will have been cooled and set to a sufficient extent to prevent undesired adhesion to other books or objects. In the event that the books are being glued with animal glue, the wet condition of the belt 330 prevents adherence of such animal glue to the belt, and hence the books may be readily and easily removed from the belt 330 at the right-hand end thereof so that they may be stagger-piled in the usual manner for drying, as indicated in Fig. 23 of the drawings.

The driving forces are applied to the drive pulley 360, by connecting the shaft 361 to the driven shaft 85 of the machine, and this is accomplished by fixing sprockets 375 and 376 on the respective shafts 85 and 361, and connecting these sprockets by an endless drive chain 377.

As hereinbefore pointed out, the glue wheel 260 is constantly operated and the drive therefor is derived from the gear 130, as shown in Figs. 12 and 13. Thus, an intermediate gear 380 meshes with the gear 130, and a smaller transmitting gear 381 is meshed with the gear 380 as well as with the gear 264 which, it will be recalled, is fixed on the mounting shaft of the glue wheel 260.

The drive for the cam 185 and for the rear edge jogger unit 210 is derived through a common chain drive from the shaft 133 which, of course, is constantly driven from the gear 130, as hereinabove described. Thus, as shown in Fig. 5 of the drawings, the shaft 133 has a sprocket 385 fixed thereon and an endless chain 386 is extended, as will hereinafter be described, so as to drivingly connect this sprocket 385 with the sprocket 190 that is associated with the cam 185, and the sprocket 226 that is mounted on the axis of the shaft 225 and which serves as the driving source for the rear edge jogger unit 210. The chain 386 is extended from the upper edge of the sprocket 385 in a right-hand direction and somewhat downwardly, as viewed in Fig. 5, and is extended beneath and about a guide sprocket 387 and is then reversely extended to the left beneath the sprocket 225 and then upwardly about the left-hand side of such sprocket and then to the right from the top of this sprocket, as shown in Fig. 5. The chain is then extended across the top of the sprocket 190 and around the right-hand edge thereof, and it is then extended downwardly and to the right about a stationary guide sprocket 388, from which sprocket the chain extends further to the left and in an upward direction past a take-up sprocket 389 and to the lower edge of the sprocket 385. This serves to drive the rear edge jogger unit 210 and the feed cam 185 in timed relation to the other elements in the machine.

The feed belts 155B of the magazine M are also driven in timed relation to the operation of the machine, but such belts 155B are intermittently driven and are actuated in each cycle in an amount that may be adjusted in accordance with the thickness of the books that are being glued. Thus, as shown in Figs. 2, 4 and 4-A, the shaft 164, upon which the belt-actuating pulleys 166 are mounted, is connected by a universal joint 390 to one end of a transmitting shaft 391, the other end of which is connected by a universal joint 392 to a horizontal shaft 393. This shaft 393 is disposed in an aligned relationship with respect to a drive shaft 394, and is adapted to be connected to the shaft 394 by means of a ratchet type clutch 395 that will be described in detail hereinafter. The shaft 394 is connected by bevel gears 396 to the cross-shaft 133 which drives the feed conveyor 136, and the drive shaft 394 is, therefore, constantly rotated during operation of the machine. The ratchet type clutch 395 is effective to operatively connect the shaft 394 to the shaft 393 throughout a predetermined and adjustable angular portion of the rotative travel of the shaft 394, thereby to cause an adjustable advancing movement of the belts 155B in each cycle of machine operation. This is accomplished by affording a ratchet wheel 400 that is fixed on the shaft 393 adjacent to its right-hand end as viewed in Fig. 4, and on the shaft 394 adjacent to the ratchet wheel 400, a transversely extending carrier arm 401 is fixed so that it is constantly rotated with the shaft 394 in a plane adjacent to the ratchet wheel 400. The carrier arm 401 has a transverse rock shaft 403 mounted on one end thereof and parallel to the axis of the shaft 394. On one end of this shaft 403, a drive pawl 404 is fixed so that by rocking movement of the shaft 403, the pawl 404 may be moved into or out of engagement with respect to the ratchet wheel 400. An arm 405 on the shaft 403 has a spring 406 acting thereon between the other end of the carrier arm 401 and the arm 405 to tend to rotate the shaft 403 to engage the drive pawl 404 with the ratchet wheel 400. Such engagement is, however, controlled by a pair of adjustable, stationarily mounted cams 410A and 410B, each of which has a lobe L that extends through substantially 180° of the periphery of the cam. The cams 410A and 410B have arcuate slots formed therein throughout substantially 90° so that a locking bolt 411 may extend therethrough while at the same time permitting the desired angular adjustment of these cams, as will hereinafter be described. The two cams 410 are disposed against the left-hand face of a mounting bracket 412 that is secured to the frame of the machine in such a position that the shaft 394 passes through such bracket. The location of the cams 410 is such that these cams are relatively close to the carrier arm 401, and the arm 405 of the rock shaft 403 has a relatively long cam roller 415 mounted on the end thereof so that the spring 406 normally tends to maintain the roller 415 in engagement with the edge surfaces of the two cams 410. The cams 410 are so adjusted that the desired angular engagement of the pawl 404 with the ratchet wheel 400 is attained in each cycle of operation of the machine, and it might be pointed out in this respect that so long as the roller 415 is in engagement with either of the lobes L of these cams, the pawl 404 is disengaged, but during the balance of the rotative movement of the shaft 394, or, in other words, when the roller 415 is opposite the low portions of the cams, the pawl 404 is engaged with the ratchet wheel 400 and serves to drive the belts 155B. It might be pointed out that the extent of movement of the belts 155B is, in most instances, aranged to be somewhat greater than the thickness of the books that are being fed, this expedient serving to insure completion of the feeding movement despite the fact that the books are fed merely by friction of the belts against the lower edges of the books.

In the gluing of books, it has been found that in some instances the assembly of the books has been carelessly done, and in such an instance a book that has been sewn together may include one or more extra signatures S so as to be of an unduly great thickness. When such an oversize book is fed into the machine, it will be evident that the clamping action between the two clamping conveyors will be disturbed, and while this situation does not arise very frequently, it may be considered desirable to avoid the adverse effects that follow in many instances. Thus, it will be clear that when an oversize book is encountered, it will necessarily tend to separate or spread the clamping conveyors, thereby tending to release the clamping action on the adjacent books that may be between the clamping conveyors, and this may result in spoiling one or more books. In order that this may be avoided in those instances where the cost is considered objectionable, one of the back-up structures associated with the clamping conveyors may take the form illustrated in Figs. 13-A and 13-B of the drawings. In accomplishing this, the rear rail 60R is shown in Fig. 13 as being of a somewhat greater thickness than in Fig. 16, and the bearing strip 61R is illustrated as being mounted on the rail 60R by means of springs 420 that are seated at their opposite ends in mounting recesses 421 and 422 formed, respectively, in the members 61R and 60R. These springs are arranged at relatively close intervals, and a row of springs is disposed adjacent the upper edge as well as the lower edge of the bearing strip 61R. With this arrangement, the belt 52R may conform with the thickness of the books that are encountered, and in the event that an oversize book passes into the clamping conveyor mechanism, it will cause the belt 52R to be moved rearwardly only in that area that is opposite or immediately adjacent to such book, the other portions of the belt remaining in their normal plane so as to maintain the desired clamping action on the adjacent books that are of the proper size. This avoids unclamping of the adjacent books by an oversize book and insures that there will be no spoilage of books that are otherwise satisfactory.

From the foregoing description it will be apparent that the present invention materially simplifies the gluing of book backs, and enables such gluing to be performed at a relatively high rate of speed while at the same time insuring uniformity and accuracy in the finished product.

It will also be evident that the present invention enables such gluing operations to be performed with either hot melt adhesives or animal glues, and enables this to be accomplished in a single machine without any material alterations in the machine. Furthermore, the present invention affords means in such a book back gluing machine which is effective where hot melt adhesives are used to quickly set such adhesive and dissipate the heat so that the book back gluing operation may be performed at a relatively high speed, and this means is afforded in a form such that undesired adhesion is avoided where the relatively slow setting animal glues are employed.

It will also be apparent from the foregoing description that the present invention enables the signatures to be fed automatically into the gluing machine in groups, and enables the signatures included in each such group to be readily shifted and positioned one with respect to the other so as to insure accuracy and uniformity in the finished product. Moreover, the present invention enables such automatic feeding of the groups of signatures and such positioning or aligning of the signatures of such group with respect to each other to be readily and easily attained, and enables this to be accomplished at a relatively high rate of speed in such a way that the operations may be performed by mechanism of a character that may be simply and easily maintained.

It will also be clear that the present invention affords a book back gluing machine that is capable of handling books of different thicknesses, and that the machine is so arranged to enable the machine to be set quickly and easily for any different thickness of book.

It will also be evident that under the present invention the brushing operation which removes the excess glue is performed accurately and without transferring glue to the end edges of the books. Moreover, under the present invention, the brushing operation of the aforesaid character is performed on the books that are moving rapidly through a machine, and this brushing operation is performed and controlled in such a way that proper operation of the machine on books of different sizes is assured.

We claim:

1. In a machine for gluing book backs, a horizontally disposed glue applying means, a glue-brushing means disposed adjacent to said glue applying means and mounted for vertical shifting movement between a lower ineffective position and an upper effective position, a clamping conveyor comprising a pair of endless belts, guiding and driving pulleys for the respective belts mounted on vertical axes and operable to dispose said belts with a first run of one belt disposed in opposed and adjacent relation to a first run of the other belt so that said first runs of the two belts constitute clamping runs between which a group of signatures that are to constitute a book may be clamped with the folded edges of the signatures exposed in a horizontal plane beneath said clamping runs of said belts, said clamping runs extending over said glue applying means and said glue-brushing means, synchronized means driving one pulley associated with each belt to drive said clamping runs of said belts in a direction such that a group of signatures is moved first over said glue-applying means and then over said glue-brushing means, back-up means for the clamping runs of said belts to assure uniformity of clamping of such a group of signatures during advancing movement by said belts, sensing means adapted to be engaged by each such group after application of glue thereto and when the leading edge of such group is disposed over said glue-brushing means, actuating means operable under control of said sensing means to raise said glue-brushing means to its effective position, a fabric discharge conveyor belt onto which the glued books are discharged by said clamping belts, and means for maintaining said fabric discharge belt in a wet condition.

2. In a machine for gluing book backs, a horizontally disposed glue applying means, a glue-brushing means disposed adjacent to said glue applying means and mounted for vertical shifting movement between a lower ineffective position and an upper effective position, a clamping conveyor comprising a pair of endless belts, guiding and driving pulleys for the respective belts mounted on vertical axes and operable to dispose said belts with a first run of one belt disposed in opposed and adjacent relation to a first run of the other belt so that said first runs of the two belts constitute clamping runs between which a group of signatures that are to constitute a book may be clamped with the folded edges of the signatures exposed in a horizontal plane beneath said clamping runs of said belts, said clamping runs extending over said glue-applying means and said glue-brushing means, synchronized means driving one pulley associated with each belt to drive said clamping runs of said belts in a direction such that a group of signatures is moved first over said glue-applying means and then over said glue-brushing means, back-up means for the clamping runs of said belts to assure uniformity of clamping of such a group of signatures during advancing movement by said belts, sensing means adapted to be engaged by each such group after application of glue thereto and when the leading edge of such group is disposed over said glue-brushing means, and actuating means operable under control of said sensing means to raise said glue-brushing means to its effective position.

3. In a machine for gluing book backs, glue-applying means, a glue-brushing means disposed adjacent to said glue-applying means and mounted for shifting movement between an ineffective position and an effective position, a clamping conveyor comprising a pair of endless belts, guiding and driving pulleys for the respective belts mounted on parallel axes and operable to dispose said belts with a first run of one belt disposed in opposed and adjacent relation to a first run of the other belt so that said first runs of the two belts constitute clamping runs between which a group of signatures that are to constitute a book may be clamped with the folded edges of the signatures exposed in a plane parallel to the edges of said clamping runs of said belts, said clamping runs extending past said glue-applying means and said glue-brushing means, synchronized means driving one pulley associated with each belt to drive said clamping runs of said belts in a direction such that a group of signatures is moved first past said glue-applying means and then past said glue-brushing means, and actuating means operable to shift said glue-brushing means to its effective position whenever a book is disposed opposite said brushing means, said actuating means including a sensing element projecting into the path of the clamping runs and means under control of the sensing element to shift the glue-brushing means to effective position after the leading edge of a signature has engaged the sensing element.

4. In a machine for gluing book backs, a horizontally disposed glue-applying means, a glue-brushing means, a clamping conveyor means operable to clamp a group of signatures that are to constitute a book with the folded edges of the signatures exposed, said conveyor being movable past said glue-applying means and said glue-brushing means in succession, and means operable while each such book is moving past said brushing means to shift said brushing means into engagement with the folded edges of the signatures, said last-named means being under control of a shiftable sensing element disposed to be engaged by the leading end of each such book passing therebeneath to thereby effect shifting of the glue-brushing means into said engagement and to effect lowering of the glue-brushing means out of said engagement as the trailing end of such book passes the sensing element.

5. In a machine for gluing book backs, a glue-applying means, a glue-brushing means disposed adjacent to said glue-applying means and mounted for shifting movement between an ineffective position and an effective position, a clamping conveyor having a predetermined path of movement and embodying means for clamping a series of groups of signatures that are respectively intended to constitute books with the folded edges of the signatures of the several groups exposed in a common plane parallel to said path, said path extending past said glue-applying means and said glue-brushing means, means driving said conveyor in a direction such that each such group of signatures is moved first past said glue-applying means and then past said glue-brushing means, sensing means adapted to be engaged by each such group after application of glue thereto and when the leading edge of such group is disposed opposite said glue-brushing means, and actuating means operable under control of said sensing means to shift said glue-brushing means to its effective position.

6. In a machine for gluing book backs, a glue-applying means, a glue-brushing means disposed adjacent to said glue-applying means and mounted for vertical shifting movement between a lower ineffective position and an upper effective position, a clamping conveyor having a predetermined path of movement and embodying means for clamping a series of groups of signatures that are respectively intended to constitute books with the folded edges of the signatures of the several groups exposed in a common plane parallel to said path, said path extending past said glue-applying means and said glue-brushing means, means driving said conveyor in a direction such that each such group of signatures is moved first past said glue-applying means and then past said glue-brushing means, and actuating means effective whenever a book is disposed opposite said brushing means to shift said glue-brushing means to its effective position, said actuating means including a sensing element adapted to be engaged by the leading end of a book passing therebeneath and adapted to be released by the trailing end of a book passing therebeneath whereby the brushing means are respectively shifted into effective position and lowered into an ineffective position.

7. In a machine for gluing book backs, a horizontally disposed glue applying means, a clamping conveyor comprising a pair of endless sheet metal belts, guiding and driving pulleys for the respective belts mounted on vertical axes and operable to dispose said belts with a first run of one belt disposed in opposed and adjacent relation to a first run of the other belt so that said first runs of the two belts constitute clamping runs between which a group of signatures that are to constitute a book may be clamped with the folded edges of the signatures exposed in a horizontal plane beneath said clamping runs of said belts, said clamping runs extending over said glue applying means, synchronized means driving one pulley associated with each belt to drive said clamping runs of said belts in a direction such that a group of signatures is moved over said glue-applying means, back-up means for the clamping runs of said belts to assure uniformity of clamping of such a group of signatures during advancing movement by said belts, each of said back-up means including an elongated and self-adjusting bearing strip against which the related belt runs thereby to accommodate signatures of varying thickness, a fabric discharge conveyor belt onto which the glued books are discharged by said clamping belts, and means for maintaining said fabric discharge belt in a wet condition.

References Cited in the file of this patent
UNITED STATES PATENTS

| Number | Name | Date |
|---|---|---|
| 845,369 | Murray | Feb. 26, 1907 |
| 1,023,569 | Juengst | Apr. 16, 1912 |
| 1,168,467 | Bell | Jan. 18, 1916 |
| 1,534,701 | Gray | Apr. 21, 1925 |
| 1,811,201 | Kleineberg | June 23, 1931 |
| 2,163,812 | Schramm | June 27, 1939 |
| 2,190,970 | Ashlock | Feb. 20, 1940 |